United States Patent [19]

Faris

[11] 4,217,799

[45] Aug. 19, 1980

[54] CANDLE LATHE

[76] Inventor: W. Frank Faris, 4026 S. Villa, Oklahoma City, Okla. 73119

[21] Appl. No.: 15,373

[22] Filed: Feb. 26, 1979

[51] Int. Cl.² .......................... B23B 3/00; B23B 3/02; B23B 3/28

[52] U.S. Cl. ...................................... 82/1 C; 82/1 R; 82/6 R; 82/2 D; 142/1; 142/38

[58] Field of Search ................ 82/1 R, 1 C, 2 D, 6 R, 82/6 A; 142/1, 7, 8, 9, 24, 45, 46, 27, 21, 36, 37, 38, 49, 57

[56] References Cited

U.S. PATENT DOCUMENTS

| | | | |
|---|---|---|---|
| 269,893 | 1/1883 | Sparks | 142/1 |
| 652,358 | 6/1900 | Grode | 142/38 |
| 1,350,840 | 8/1920 | Robbins | 82/2 D |
| 1,482,224 | 1/1924 | Engman | 142/1 |
| 2,629,936 | 3/1953 | Cronstedt | 82/1 C |
| 3,153,436 | 10/1964 | Chesley | 82/1 R |
| 3,316,946 | 5/1967 | Ryan et al. | 142/1 |
| 3,844,186 | 10/1974 | Youden et al. | 82/2 D |

FOREIGN PATENT DOCUMENTS

| | | | |
|---|---|---|---|
| 420099 | 4/1947 | Italy | 82/2 D |

*Primary Examiner*—Harrison L. Hinson
*Attorney, Agent, or Firm*—Robert K. Rhea

[57] ABSTRACT

An upright box-like housing, having a forwardly open front, is supported by a base overlying a horizontal surface. A base mounted motor rotates an elongated candle blank within the housing about a vertical axis when interposed between a motor drive shaft supported spindlehead adjacent the bottom end wall of the housing and a tailstock journalled by the housing top end wall. A cutting tool guide and shavings shield, coextensive with the housing height, is pivotally supported at one side of the housing for movement toward and away from the vertical axis of the candle.

7 Claims, 11 Drawing Figures

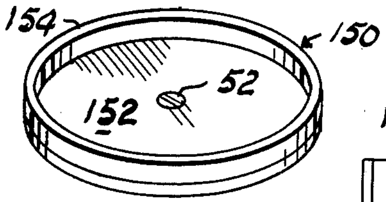
FIG.10
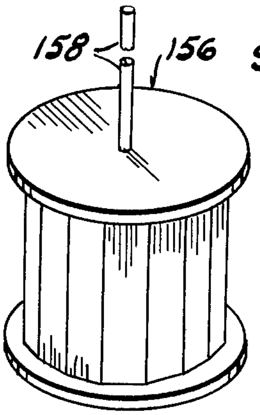
FIG.11
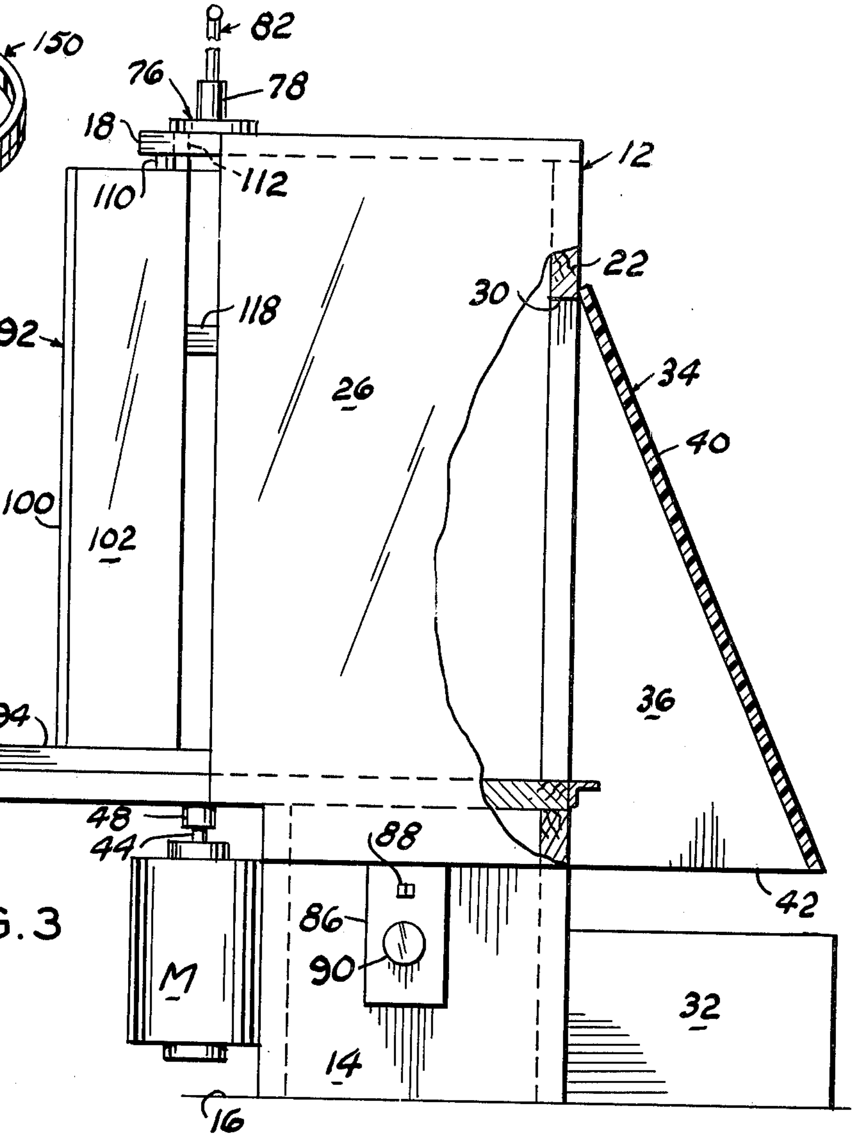
FIG.3
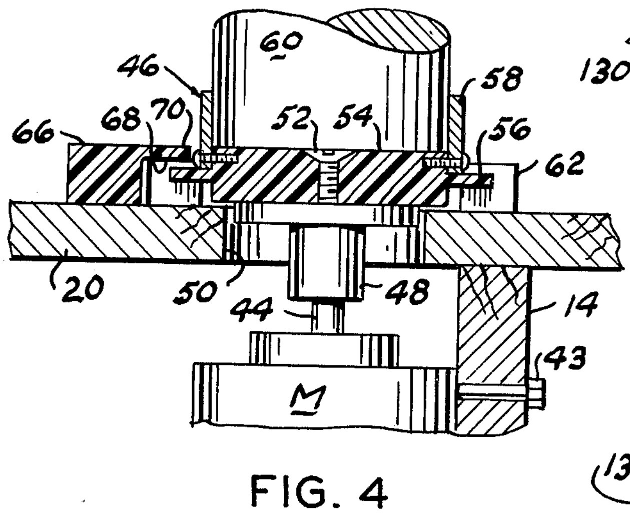
FIG. 4
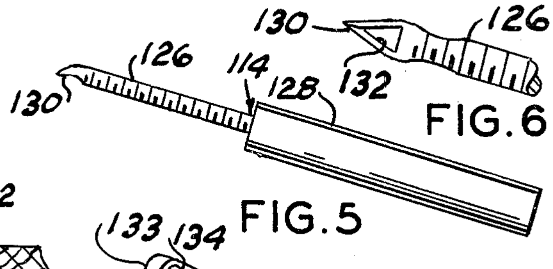
FIG.6
FIG.5
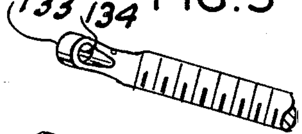
FIG. 7
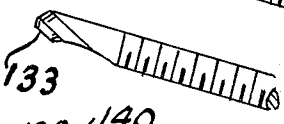
FIG. 8
FIG.9

CANDLE LATHE

BACKGROUND OF THE INVENTION

1. Field of the Invention.

The present invention relates to forming decorative candles and more particularly to a lathe for carving such candles.

Candles are usually formed by pouring melted wax into a mold, however, some individuals desire candles having a configuration which is distinctive over candles available in quantity on the open market. It is impractical from an economic view point to form molds for a relatively small number of candles having a distinctive periphery. Therefore, some individuals prefer to form candles having a configuration of their own choosing. This is not easily accomplished by turning tools presently available, such as wood lathes, principally on account of the low density of candles when forming a particular candle configuration of small diameter. Futhermore, it is difficult to form additional candles forming a "set", each having an identical configuration with other candles of the set.

This invention provides a device which permits forming one or a plurality of candles of identical or different configurations.

2. Description of the Prior Art

The prior art generally relates to lathes for turning metal and wood materials in which the longitudinal axis of the workpiece is disposed horizontally, however, when the workpiece is a wax candle a horizontal workpiece axis is impractical on account of the low density of the wax, particularly in those candles of small diameter.

This invention provides an apparatus including a housing supporting an elongated candle therein with its axis disposed vertically and which includes a cutting tool brace and shavings shield for confining wax shavings within the housing for disposal through a housing discharge opening and further provides a means for forming a duplicate of a previously shaped candle.

SUMMARY OF THE INVENTION

An upright box-like housing, having a forwardly open front and a rearward shavings discharge opening, is supported by a base overlying a horizontal surface. The bottom end wall of the housing projects forwardly of the base and side walls to form a work platform. A motor is mounted on the base below the platform with the motor drive shaft disposed vertically and connected with a spindlehead, overlying the platform through an opening therein. A tailstock is mounted on the housing top end wall coaxial with the spindlehead for supporting a candle blank, in combination with the spindlehead, for rotation about a vertical axis. A shavings guard, overlying the upper surface of the platform, surrounds the forwardly disposed portion of the spindlehead. A cutting tool brace and shavings deflector, coextensive with the height of the housing is pivotally mounted at one side of the platform for horizontal movement toward and away from the axis of the candle. A post, extending between the platform and housing top laterally of the workpiece, supports a panel for receiving a candle shadow image for use as a guide when forming a duplicate of the candle configuration.

The principal object of this invention is to provide a candle carving lathe for forming candles having a desired configuration and including a means and method of forming duplicates of previously formed candles.

BRIEF DESCRIPTION OF THE DRAWINGS

FIG. 3 is a right side elevational view of FIG. 1 with parts broken away and sectioned for clarity;

FIG. 4 is fragmentary vertical cross sectional view, to a larger scale, taken substantially along the line 4—4 of FIG. 1;

FIG. 5 is a side elevational view of a cutting tool;

FIG. 6 is a fragmentary elevational view of the cutting tip and shank of the tool shown by FIG. 5 when rotated 90° about its axis;

FIG. 7 is a fragmentary elevational view of another cutting tool tip and shank;

FIG. 8 is a side elevational view of the tool tip shown by FIG. 7 when rotated 90° about its axis;

FIG. 9 is a fragmentary elevational view of another cutting tool tip and shank;

FIG. 10 is a perspective view, to a different scale, of a pottery wheel for replacing the spindlehead; and, FIG. 11 is a perspective view of a lapidary tumbler to be interposed between the motor drive shaft and the tailstock.

DESCRIPTION OF THE PREFERRED EMBODIMENTS

Figure 2:
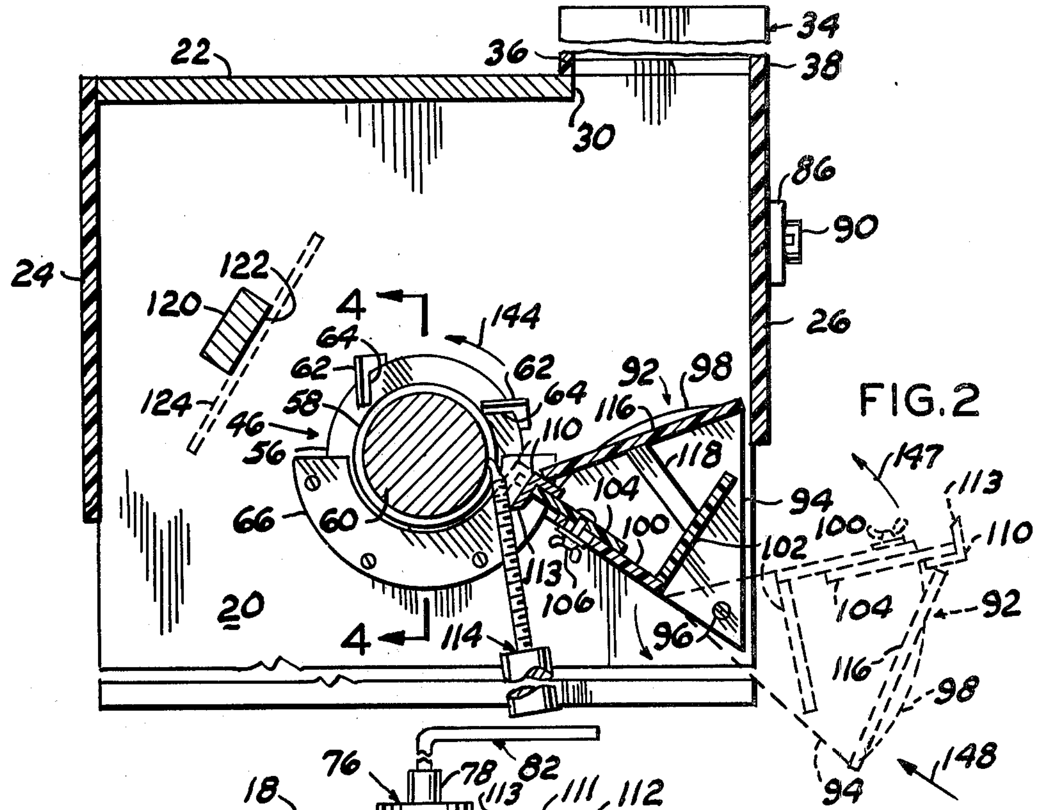
FIG. 2 is a fragmentary horizontal cross sectional view, taken substantially along the line 2—2 of FIG. 1 and illustrating, by dotted lines, the movement of the cutting tool support brace and the position of a shadow image receiving panel.

Like characters of reference designate like parts in those figures of the drawings in which they occur.

In the drawings:

Referring to FIGS. 1 to 4, the reference numeral 15 indicates the device, as a whole, which is box-like in general configuration comprising a housing 12 supported by a base 14 overlying a horizontal surface 16. The housing 12 includes horizontal top and bottom walls 18 and 20, respectively, joined to a back wall 22 and having preferably transparent side walls 24 and 26 defining a forward opening or front 28 for the housing. The bottom wall 20 projects forwardly of the housing top and sides to form a horizontal platform. The back wall 22 is provided with a vertically elongated opening 30 adjacent the side wall 26 for discharging candle shavings, not shown, into a suitable receptacle 32 through a chute 34 cooperatively disposed behind the housing 12. The shavings chute 34 is formed by a wall 36 parallel with a rearwardly extending portion 38 of the side wall 26 and having an overlying downwardly inclined cover 40 defining a chute bottom opening 42 disposed above the receptacle 32.

A variable speed motor M is mounted by bolts 43 on the base 14 below the platform 20 with the drive shaft 44 of the motor disposed vertically. Spindlehead means 46 overlies a platform opening 50 coaxial with the motor drive shaft 44 and is connected thereto, by a spindlehead coupling 48 secured to the motor shaft 44, by a screw 52. The platform opening 50 is disposed medially the width of the platform 20 with its axis rearwardly of the vertical plane defining the forward edge of the housing top wall 10 for the reasons presently apparent. The spindlehead means 46 includes a disk 54 having a diameter greater than the platform opening 50 and an annular outstanding flange 56 medially its height. An upstanding sleeve 58 surrounds and is secured to the disk 54 above the flange 56. The diameter of the sleeve 58 and disk 54 is such that the sleeve frictionally receives, in surrounding relation, the depending end portion of an elongated cylindrical candle 60. Obviously a bushing, not shown, may be placed within the sleeve 58 for drivingly supporting candles of relatively small diameter. The spindlehead means further includes a plurality of fins 62, preferably formed from flexible sheet material, such as rubber, substantially square in elevation, and angularly disposed edgewise in slots 64 formed in the disk flange 56 for the purpose of deflecting candle shavings away from the spindlehead and the platform opening 50.

A semicircular shavings guard 66 is secured to the platform 20 forwardly of and in partially surrounding relation with respect to the spindlehead. The guard 66 is provided with a right angular recess 68 forming a lip or ledge 70 loosely overlying the disk flange 56 and permitting passage of the fins 62 thereunder.

The upper end portion of the candle 60 is nested by an inverted cup-shaped member 72 secured to a cup hub 74 coaxially aligned with tailstock means 76. The tailstock means comprises a pair of hub members 78 and 80 respectively secured to the top and bottom surfaces of the top wall 18 in surrounding relation with respect to an aperture therethrough, not shown, coaxial with the spindlehead 46. An elongated L-shaped tailstock rod or shaft 82 includes a leg portion 84 coaxially received by the tailstock and which projects into the cup hub 74 thus permitting angular rotation of the candle 60 when the spindlehead is driven by the motor M, as presently explained.

The motor M is connected with a source of electrical energy, not shown, through a base mounted control box 86 including an off-on switch 88 and a rheostat 90.

Carving knife or cutting tools guide and shavings shield means 92 is pivotally mounted at one forward side portion of the platform 20 for movement toward and away from the axis of the candle 60. The cutting tool guide means includes a substantially triangular-shaped base 94 having the apex portion of the triangular-shape secured to the platform 20 adjacent its side edge having the side wall 26 by a screw 96 for horizontal pivoting movement of the base 94 about the vertical axis of the screw. The base side of the triangular-shape is arcuately curved outwardly, as at 98, on a radius equal to the spacing between the vertical axis of the screw 96 and the periphery of the guard 66 to maintain candle shavings rearwardly of the guide and shield means 92 during movement of the latter.

A pair of right angularly disposed elongated panels 100 and 102, formed from transparent material and at least coextensive with the spacing between the spindlehead and tailstock, are vertically disposed on the triangular base 94 for supporting a transparent sliding panel 104 flatly secured to the panel 100 for horizontal movement in a vertical plane toward and away from the candle 60. The sliding panel 104 is secured to the panel 100 by thumb screws and bolts 106 slidably projecting through slots 108 formed in the panel 100. An elongated right angle brace 110 is longitudinally secured to the vertical edge of the sliding panel 104 projecting toward the candle 60. The length of the brace 110 is such that it extends between the upper surface of the triangular base 94 and the upper surface of the housing top wall 18. The upper end portion 111 of the brace 110 is nested by a cooperating right angular recess 112 formed in the forward edge of the top wall 18 to form a stop for the brace and shield means 92. The vertical edge of the forwardly projecting brace leg is beveled, as at 113, to form a knife edge surface for positioning a cutting tool 114 thereagainst in the manner presently explained. The guide and shield means 92 further includes an elongated upstanding transparent panel 116 overlying the base portion of the triangular base 94 and rigidly supported by a cross brace 118 connected with the panel 102.

An elongated rectangular post 120 extends vertically between the housing top wall 18 and platform 20 on that side of the spindlehead 26 substantially diametrically opposite the screw 96. One flat vertical face 122 of the post faces the candle 60 for supporting a planar sheet 124, such as a section of cardboard, or the like, for the purposes presently explained.

Referring now to FIGS. 5 through 9, the candle turning or cutting tool 114 comprises an elongated section or shank formed from a screw threaded rod 126 having an elongated handle 128 coaxially connected with one of its ends. The other end of the rod 126 is shaped to provide a hook-shaped pointed end portion 130 having a triangular-shaped opening 132 therein for engaging the periphery of the candle 60. The purpose of the screw threads is to receive an intermediate portion of the sharpened edge 113 of the angle brace 110, between any two threads, to assist the operator in maintaining the cutting tool 130 in a desired candle cutting contact with the candle.

FIGS. 7 and 8 illustrate the cutting tip end 132 of a companion cutting tool which is generally circular in shape and similarly includes a central aperture 134 for the purpose of removing more material from the periphery of the candle 60. A modification of the cutting tip, shown by FIGS. 7 and 8, is illustrated in FIG. 9 wherein a similar circular cutting tip 136, mounted on an elongated extension 138, is frictionally received slidably through an aperture 140 formed through the threaded shank 142 in angular relation with respect to its longitudinal axis which permits the cutting tip 136 to be disposed adjacent or remote from the axis of the shank 142.

OPERATION

Figure 1:
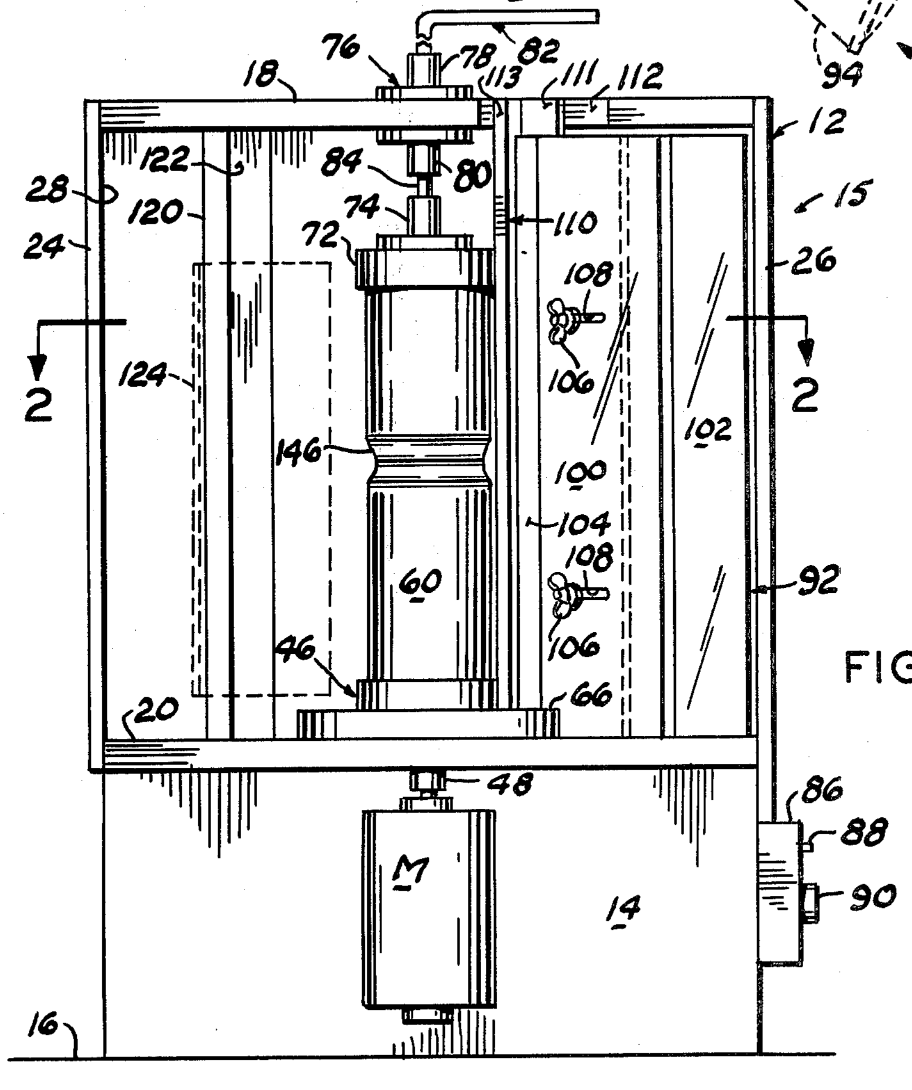
FIG. 1 is a front elevational view of the device.

In operation, one end of the candle 60 is placed within the spindlehead sleeve 58 with the other end portion of the candle received by the cup 72. The tailstock shaft leg 84 is inserted through the tailstock 76 and into the cup hub 74. The cutting tool guide and shaving shield means 92 is disposed in its solid line position (FIG. 2). The motor is started and adjusted by the rheostat 90 to angularly rotate the spindlehead and candle in the direction of the arrow 144 at a desired rate. A selected one of the cutting tools is manually positioned horizontally with one of the threads on the cutting tool shank receiving an intermediate portion of the cutting tool brace edge 113 to steady the tool while the cutting tool tip is moved into contact with the periphery of the candle 60 to remove a portion of the wax material, for example, as indicated at 146 (FIG. 1). The cutting tool shank threads and brace edge 113 permits the cutting tool shanks to be moved vertically along the edge 113 while maintaining the tip of the cutting tool in contact with the candle 60 to form a desired configuration. Wax shavings, not shown, falling from the candle, are swept away from the position of the spindlehead by the fins 62 and tend to be thrown and fall by gravity rearwardly of the shield panel 116. After shaping the candle, wax shavings are removed from the platform 20 by pivoting the brace and shield means 92 to the position shown by dotted lines (FIG. 2) which permits the shavings to be scrapped and pushed toward the housing exhaust opening 42 to fall by gravity into the receptacle 32 for remelting the wax shavings and forming other candles as is conventional.

In order to form a duplicate of the carved candle, the cardboard 124 is temporarily attached to the post 120 and with the cutting tool guide and shavings shield means 92 is preferably pivoted further toward the side wall 26, as indicated by the arrow 147, a point light source, not shown, is disposed to shine, in the direction of the arrow 148, toward the candle 60 to cast a shadow thereof, not shown, on the adjacent face of the cardboard 124. The outline of the candle shadow is traced on the cardboard 124 to form a guide for forming a duplicate candle. The carved candle 60 is then removed and a second cylindrical candle, not shown, is similarly supported by the spindlehead and tailstock and the cutting tool guide and shavings shield means 92 returned to its solid line position of FIG. 2. With the point light source 148 "on" providing illumination to cast a shadow of the second candle on the cardboard 124, the candle carving action is repeated wherein the surface of the candle is removed by the cutting tools until the periphery of the shadow cast by the second candle coincides with the outline shadow previously drawn on the cardboard. The purpose of the transparent panels forming the cutting tool guide and shield means 92 is to prevent undesirable shadows appearing on the cardboard 124 during this action.

Obviously, the device may be used for purposes other than candles, for example, a pottery wheel 150 (FIG. 10) comprising a circular plate 152 and a surrounding upstanding ring 154 may be connected with the motor shaft coupling 148 by the screw 52 in place of the spindlehead. Similarly, a grinding disk or buffer, not shown, may be connected with the motor shaft in place of the spindlehead. Additionally, a lapidary drum 156, having an elongated support axle or rod 158, is inserted into the motor coupling 48 at its depending end and supported at its other end by the tailstock 76. When using the lapidary drum 156 the housing is preferably disposed horizontally on the housing side wall 24 and the motor adjusted for the desired angular rotation of the drum.

Obviously the invention is susceptible to changes or alterations without defeating its practicability. Therefore, I do not wish to be confined to the preferred embodiment shown in the drawings and described herein.

I claim:

1. A candle lathe, comprising:
- an upright box-like housing having an open front and having a bottom end wall forming a horizontal platform;
- base means underlying said platform for supporting said housing; a motor having a vertically disposed drive shaft supported by said base means;
- spindlehead means overlying said platform and coaxially connected with said drive shaft through said platform for rotatably supporting a vertically disposed candle;
- tailstock means supported by said housing in vertically spaced coaxial alignment with said spindlehead means for maintaining a candle concentric with said spindlehead; and,
- vertically elongated cutting tool guide and shield means pivotally supported by said platform for movement toward and away from the axis of said candle.

2. The lathe according to claim 1 in which said spindlehead means includes:
- a right-circular disk having an annular outstanding flange medially its height;
- a plurality of generally vertical flexible fins transversely secured to said flange;
- an upstanding sleeve secured to said disk above said flange;
- a drive shaft coupling coaxially underlying said disk and secured to said drive shaft; and,
- a screw joining said disk to said coupling.

3. The lathe according to claim 2 and further including:
- arcuate shavings guard means overlying and secured to said platform forwardly of the axis of said spindlehead means in partially surrounding relation with respect to said spindlehead means for preventing candle shavings accumulation forwardly of said spindlehead means.

4. The lathe according to claim 3 in which said cutting tool guide and shield means includes:
- a polygonal-sided flat base overlying said platform laterally and forwardly of said spindlehead means and spanning the distance between said shavings guard and one side of said housing;
- upstanding panel means, at least coextensive with the spacing between said spindlehead means and said tailstock means, secured to said flat base; and,
- a vertically disposed elongated cutting tool brace secured to said panel means for movement in a vertical plane toward and away from the axis of said candle.

5. The lathe according to claim 4 in which said cutting tool guide and shield means is further characterized by;
- an arcuate outer surface on one side of said flat base formed on a radius equal to the spacing between the platform pivotal connection of said flat base and the arcuate surface of said shavings guard for maintaining contact between said shavings guard and said flat base during pivotal movement of said cutting tool guide and shavings shield means.

6. The lathe according to claim 5 in which said panel means
- substantially spans the spacing between said cutting tool brace and said one housing side for maintaining candle shavings rearwardly of said cutting tool guide and shield means.

7. The method of forming duplicate candle configurations, comprising:
- placing a first cylindrical candle between the spindlehead and tailstock of a lathe;
- turning said first candle to form a desired exterior configuration on said first candle;
- placing a panel adjacent and parallel with the axis of said first candle;
- placing a light source adjacent said first candle diametrically opposite said panel;
- energizing said light source for casting a shadow image on said panel;
- tracing the outline of said first candle shadow image on said panel;
- replacing said first candle with a second cylindrical candle; and,
- turning said second candle while maintaining said light source energized until the shadow image of said second candle coincides with the traced shadow image of said first candle.

* * * * *